Aug. 28, 1973 T. J. GUNNELL 3,755,544
CARBON BLACK PRODUCTION

Filed Jan. 4, 1971 2 Sheets-Sheet 1

INVENTOR.
T. J. GUNNELL
BY
*Young & Quigg*
ATTORNEYS

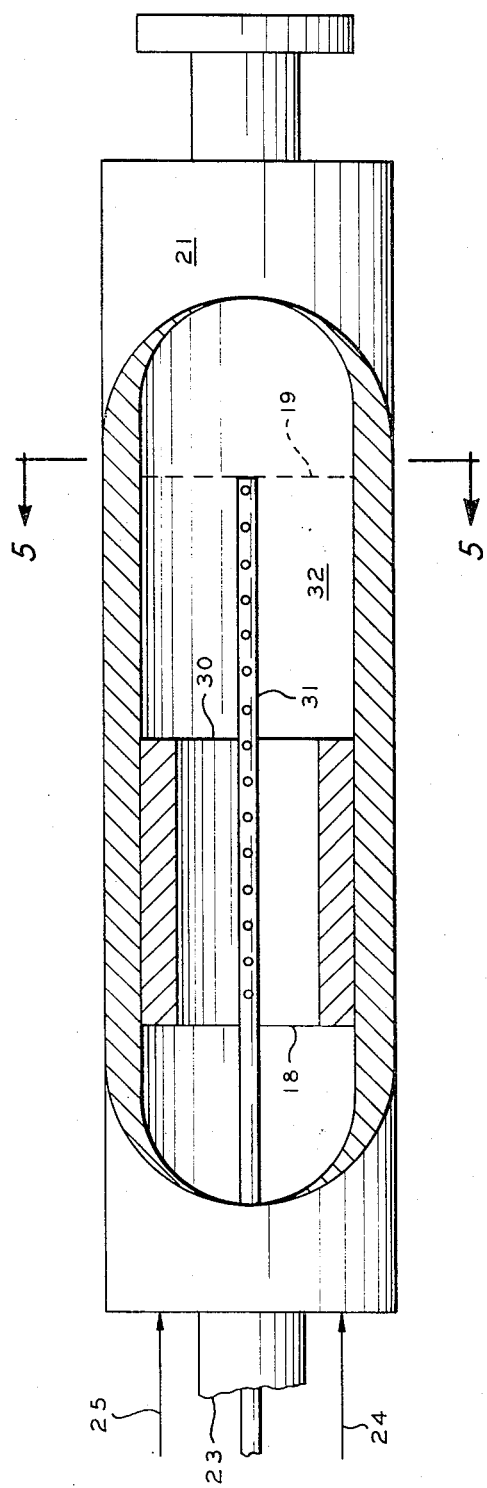
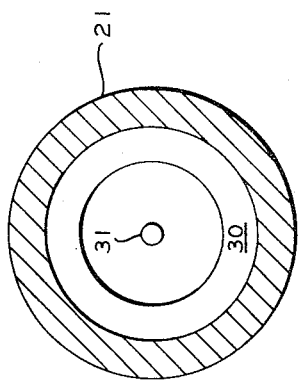
FIG. 4
FIG. 5
INVENTOR.
T. J. GUNNELL

United States Patent Office 3,755,544
Patented Aug. 28, 1973

3,755,544
CARBON BLACK PRODUCTION
Thomas J. Gunnell, Bartlesville, Okla., assignor to
Phillips Petroleum Company
Filed Jan. 4, 1971, Ser. No. 103,379
Int. Cl. C09c 1/50
U.S. Cl. 423—456                                    6 Claims

ABSTRACT OF THE DISCLOSURE

A process and apparatus for producing carbon black in which the property distribution ranges of the indivdual carbon black particles are narrowed by creating turbulence within the carbon black formation zone.

Figure 1:
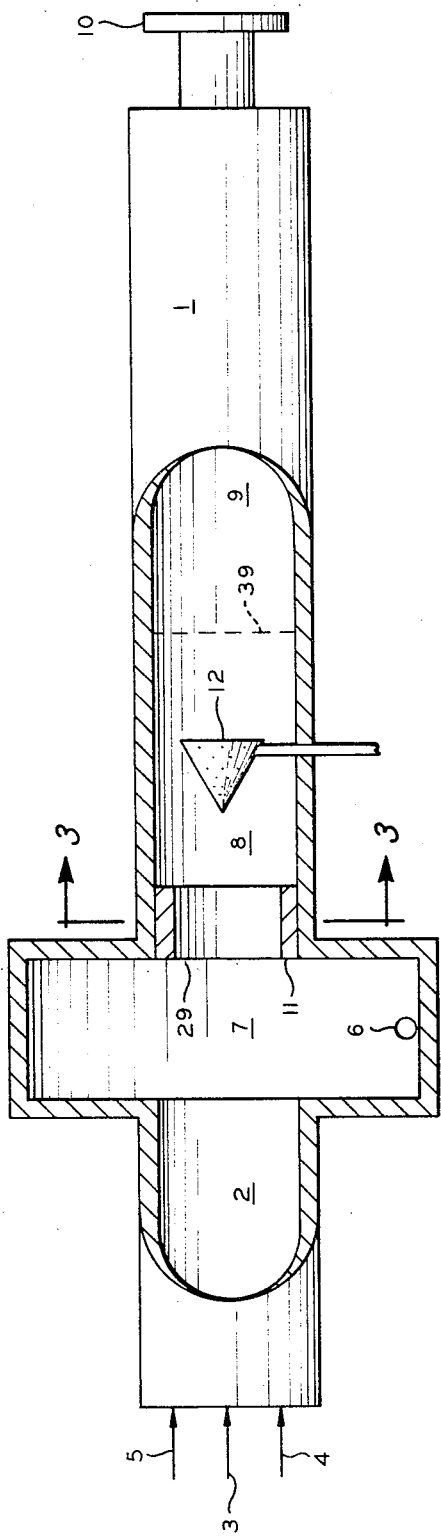

Carbon black is produced by passing a reactant mass comprising hydrocarbon feed and hot combustion gases into a carbon black formation zone wherein a fluid is introduced to increase the turbulence of the reactant mass. Means for introducing the fluid include a deflector or a conduit having apertures through which the fluid is discharged centrally into the reactant mass and outwardly towards the wall of the reactor.

This invention relates to carbon black production.

In one of its more specific aspects, this invention relates to a method of producing carbon blacks having a narrow range of property distribution.

The production of carbon black by the pyrolytic decomposition of a hydrocarbon feed in which the feed is brought to decomposition temperatures by contact with hot combustion gases produced by the oxidation of a fuel or some portion of the feed with a free oxygen-containing gas, such as air, is well known. This decomposition can be conducted in a variety of types of reactors, in all of which the carbon black is produced in an upstream portion and recovered, after cooling by quenching, from a downstream portion.

It is generally recognized that carbon black exhibits properties which are an average of the indivdual carbon particles which comprise the total product. In other words, any carbon black product will be comprised of a plurality of carbon particles, each of which has different properties such as structure, surface area, and the like.

It has now been determined that it is possible to narrow the range of the properties of the carbon particles comprising the overall product. As a result, a superior carbon black, possessing a larger percentage of those individual particles having the desired properties, is produced. This invention provides a method and apparatus for doing so.

According to this invention there is provided a method for producing carbon black in which a reactant mass is formed of the hydrocarbon feed and hot combustion gases and passed through a reactor into the carbon black formation zone. At the entry into this zone, the mass is passed through tubulence-producing means to increase the velocity of the mass and to increase its turbulence. The mass is then passed into admixture with a fluid which is introduced into the carbon black formation zone in a quantity sufficient to further increase the turbulence of the reactant mass, preferably by deflecting the mass outwordly towards the wall of the reactor, and to further heat and dilute the central portion of the reaction mass. Simultaneously, the feed is undergoing decomposition to carbon black which is recovered.

According to this invention there is also provided apparatus for the production of carbon black which comprises at least a mixing zone and a carbon black formation zone in axial contiguity. The latter zone is adapted with a first turbulence-producing means at its inlet and with a second turbulence-producing means downstream thereof, the second turbulence producing means being adapted to discharge a fluid within said carbon black formation zone.

The method and apparatus of this invention are applicable to any prior art method of producing carbon black regardless of the nature of the hydrocarbon feed, fuel, oxidant, reactor configuration or other variables.

As is known, carbon black is formed in the upstream portion of the reactor and a principal portion of the downstream section acts to increase the photelometer of the already-produced black. In other words, carbon black is formed in the upstream portion of the reactor with properties such as its structure, surface area, and the like, being determined during its formation; the downstream portion of the reactor and the reaction occurring therein affect principally the photoelometer of the carbon black.

Considering a reactor as being comprised of a reactant introduction zone, a carbon black formation zone, an after-treating zone and a quench zone, it has been determined that that portion of the reactor occupied by the carbon black formation zone represents a very short length within the reactor, that is to say, the reaction time required to produce the carbon black and to establish the surface area and structure of the black is the shortest of the various periods which make up the overall production time.

For this reason, and because the carbon black is frequently formed during introduction of reactants and before thorough mixing has occurred, the carbon black produced in the carbon black formation zone is of non-uniform quality, this giving rise to the wide range of properties to be found among the blacks comprising the final product. Further contributing to this lack of uniformity of the blacks produced is the fact that inasmuch as some of the reactants are introduced centrally along the longitudinal axis of the reactor, a different carbon black is produced in this core in which reactants are concentrated than is produced outside of this core at the periphery of the reactor. Further contributing to the lack of product uniformity is the fact that there is naturally established along the axis of the reactor those conventional flow patterns in which velocities are less at the reactor wall and increase toward the center of the reactor.

The factors contributing to this lack of uniformity in carbon black are offset by the method of the present invention which produces turbulence within the carbon black formation zone, this turbulence acting to intermix the reactants within this zone prior to the completion of the formation of the carbon black. This turbulence is partially produced by introducing a fluid into the formation zone in an amount sufficient to affect the reaction, some of this affect being accomplished by diluting and treating the reaction mass.

Figure 3:
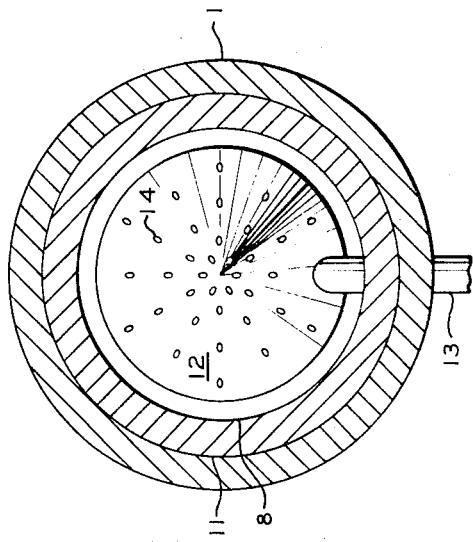
Figure 2:
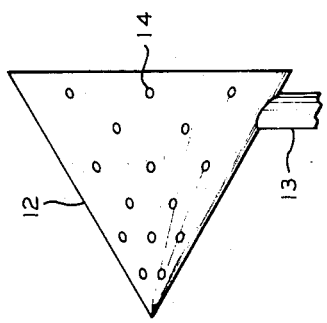

The apparatus of this invention will be more easily understood if explained in conjunction with the attached drawings in which FIG. 1 illustrates a carbon black reactor in which one embodiment of the reactor is illustrated. FIGS. 2 and 3 illustrate separate embodiments of the apparatus; FIG. 4 is another embodiment of a type of reactor which can be employed.

Referring now to FIG. 1, there is shown carbon black reactor 1 which can be of any desired configuration. For the present purposes it will be considered as being comprised of feed introduction zone 2 into which reactants are introduced through make-oil conduit 3, fuel conduit 4 and oxidant conduit 5. Additional reactants can be introduced through ports 6 into the precombustion or mixing zone 7 from which the reactant mass is introduced into carbon black formation zone 8 in which a principal portion of the carbon black is considered as being formed. The black is then conducted into quench zone 9 and is recovered from the reactor through outlet 10.

The length of that zone 8, the carbon black formation zone, for the purpose of this discussion, will be considered as extending from imaginary line 29 to imaginary line 39. It is in this zone that the method of this invention is practiced by creating turbulence and by the introduction thereinto of a fluid.

Turbulence can be created by a number of methods. It is preferred that a combination of means be employed, one involving the installation of choke 11, and a deflector 12, the deflector being of any configuration suitable for additionally mixing the reactants reacting in the zone. As shown in FIG. 2, it can be comprised of an enclosure, conical if desired, having conduit 13 discharging thereinto. Fluids from an external source are introduced into the enclosure and discharge therefrom through apertures 14. In this manner, both the deflective action of the deflector and the introduction of the fluid serve to mix the reactants as they pass through the zone and hence produce a carbon black of narrow propery distribution.

FIG. 3 illustrates the positioning of deflector 14 in relation to zone 8.

A second embodiment, shown in FIG. 4, illustrates a reactor 21 of substantially uniform diameter. Make-oil is introduced through conduit 23, fuel through conduit 24 and oxidant through conduit 25. The carbon black formation zone is considered as extending from imaginary line 18 to imaginary line 19, choke 30 being positioned therein. FIG. 5 illustrates a cross-sectional view of FIG. 4.

Positioned to discharge into the carbon black forming zone is conduit 31. It can advantageously extend into the reactor through make-oil nozzle 23. Its downstream portion extends the length of carbon black formation zone 32 along which length the conduit is apertured for the introduction of a fluid.

While it is impossible to define with accuracy the beginning or the length of the carbon black formation zone, its position is easily determined by sampling the reactor along its longitudinal axis. Preferably, the choke will be positioned with its upstream edge at the inlet to the zone and will have a length of from about ¼ to about 2 times the diameter of the reactor. The deflector or fluid introductory conduit will be positioned to discharge at any point or points along the length of the carbon black formation zone. Inasmuch as no adverse effect results if the discharge is made downstream of the carbon black formation zone, discharge can be made within the zone and to any point downstream thereof to a distance to about ½ to about 2½ times the diameter of the zone.

The fluid so introduced can be a reactant, such as hot combustion gases, hot free oxygen-containing gases and or hot inert gases such as nitrogen. Preferably, the fluid will be introduced at a temperature within carbon black formation temperature range and will be introduced in a quantity of from about 10 to about 50 volume percent of the quantity of free oxygen-containing gas introduced into the reactor. Relatedly, the fluid can be introduced in any direction but is preferably introduced in an upstream direction, and outwardly from the longitudinal axis of the reactor.

The method of the invention is demonstrated by the following data. In Run I, the invention was not employed. In Runs II and III the invention was practiced. Run II illustrates the narrowing of property distribution possible when operating under conditions substantially identical in quantities to Run I.

Run III illustrates the employment of the invention to reduce surface area distribution when operating to substantially the same surface area of the product black as produced in Run I. In all instances hot combustion gases produced from air and methane was used as the fluid to the carbon black formation zone.

| System | Run No. | | |
|---|---|---|---|
| | I | II | III |
| | Prior art | Invention | |
| Make oil, g.p.h. | 22 | 22 | 26 |
| Air, M s.c.f.hr. | 16 | 13.5 | 16 |
| Gas, M s.c.f.hr. | 1 | 0.75 | 1 |
| To carbon black formation zone: | | | |
| Air, M s.c.f.hr. | 0 | 2.5 | 2.5 |
| Methane, M s.c.f.hr. | 0 | 0.25 | 0.25 |
| Carbon black surface area, $N_2SA$, m.$^2$/gm.: | | | |
| At reactor centerline | 95 | 107 | 100 |
| At reactor periphery | 113 | 116 | 108 |
| Product | 103 | 111 | 104 |
| Surface area range | 18 | 9 | 8 |

In the above data, the range of surface area distribution is considered to be the difference between the values of surface area of the carbon black produced at the centerline of the reactor and that produced at the inner wall of the reactor.

As seen from the above data, the practice of this invention decreased this range in surface area by 9 units under substantially identical charge rates and by 10 units when the charge rates were altered when practicing the invention to produce a carbon black having substantially that surface area produced in the absence of the practice of the invention.

It will be evident that various modifications can be made to the method of this invention. However, such modifications are considered as being within the scope of the invention.

What is claimed is:

1. A method of producing carbon black by the pyrolytic decomposition of a hydrocarbon feed in which said feed is brought to decomposition temperatures by contact with hot combustion gases produced by the oxidation of a fuel with a free oxygen-containing gas which comprises:
    (a) forming a mass comprising said feed and hot combustion gases within a carbon black reactor;
    (b) passing said mass through a choke positioned in a carbon black forming zone of said reactor to increase the turbulence of said mass;
    (c) introducing a fluid selected from the group consisting of hot combustion gases, hot free oxygen-containing gases and hot inert gases centrally into said mass within said carbon black forming zone and outwardly towards the wall of said reactor to increase the turbulence of said mass while decomposing said feed to produce carbon black; and,
    (d) recovering said carbon black.

2. The method of claim 1 in which said fluid is introduced in an amount within the range of from about 10 to about 50 volume percent of the quantity of free oxygen-containing gas introduced into the reactor.

3. The method of claim 1 in which said fluid is introduced in a plurality of streams.

4. The method of claim 1 in which said fluid is introduced at a plurality of loci along the length of said carbon black forming zone.

5. A carbon black reactor which comprises:
(a) a mixing zone and a carbon black forming zone in axial congruity;
(b) a choke positioned in the upstream portion of said carbon black forming zone; and,
(c) a conduit for introducing a fluid into said carbon black forming zone extending through said choke along the longitudinal axis of said reactor, said conduit extending through said carbon black forming zone and being apertured along a substantial portion of its length and adapted to discharge fluid outwardly towards the wall of said reactor.

6. The reactor of claim 5 in which said conduit extends through said mixing zone into said carbon black forming zone.

References Cited
UNITED STATES PATENTS

| | | | |
|---|---|---|---|
| 3,582,277 | 6/1971 | Kraus | 23—209.4 |
| 3,235,334 | 2/1966 | Helmers | 23—209.4 |
| 2,419,565 | 4/1947 | Kresci | 23—209.6 |
| 2,682,450 | 6/1954 | Sweigart et al. | 23—259.5 |
| 3,484,200 | 12/1969 | Johnson et al. | 23—209.4 X |
| 3,523,812 | 8/1970 | Kraus | 23—209.4 X |
| 3,256,065 | 6/1966 | Latham | 23—259.5 |
| 2,897,062 | 7/1959 | Minarik | 23—259.5 X |

EDWARD J. MEROS, Primary Examiner

U.S. Cl. X.R.
23—259.5; 423—450